United States Patent [19]

Sherman

[11] Patent Number: 5,042,598
[45] Date of Patent: Aug. 27, 1991

[54] DRILLING FLUID ADDITIVE SWEEP CARTRIDGE AND METHOD

[76] Inventor: Johnny C. Sherman, 1900 S. Missouri - Apt. 3218, Casper, Wyo. 82609

[21] Appl. No.: 539,721

[22] Filed: Jun. 18, 1990

[51] Int. Cl.$^5$ .................... E21B 7/00; E21B 33/13
[52] U.S. Cl. ...................... 175/72; 166/162; 206/524.1
[58] Field of Search ............ 175/64, 65, 72, 207, 175/308; 166/162; 206/601, 634, 524.1, 524.6, 219

[56] References Cited

U.S. PATENT DOCUMENTS

| | | | |
|---|---|---|---|
| 2,836,555 | 5/1958 | Armentrout | 252/8.5 |
| 3,362,476 | 1/1968 | Van Poollen | |
| 3,916,076 | 10/1975 | Eastes | 428/516 |
| 3,986,430 | 10/1976 | Cousen et al. | 175/72 |
| 4,063,604 | 12/1977 | Rayborn | 175/68 |
| 4,191,254 | 3/1980 | Baughman et al. | 166/286 |
| 4,378,050 | 3/1983 | Tatevosian et al. | 166/309 |
| 4,473,124 | 9/1984 | Savins | 175/68 |
| 4,514,308 | 4/1985 | Clampitt et al. | 252/8.50 |
| 4,571,422 | 2/1986 | Symes et al. | 234/114 |
| 4,611,664 | 9/1986 | Oskerhardt, III et al. | 166/310 |
| 4,614,599 | 9/1986 | Walker | 175/72 |
| 4,706,753 | 11/1987 | Ohkochi et al. | 166/286 |

OTHER PUBLICATIONS

Nalco Chemical Co—1983 Product Sheets PR-28 12 pages Covering Drilling Fluid Additive ASP-700.
Allied Colloids CO-1987 Product Sheets OSD1029 OSD1015, OSD1022, OSD1020 Covering Various Products.
"A Primer of Oil Well Drilling"—Second Edition, 114 pages 1958 by Petroleum Extension Service of University of Texas.

Primary Examiner—William P. Neuder
Attorney, Agent, or Firm—Norvell E. Van Behren

[57] ABSTRACT

A drilling fluid additive sweep cartridge and method. The cartridge contains additives and the cartridge introduces those additives at the tool joint of the next drill pipe used which is positioned in the mouse hole. A modified sweep cartridge introduces the additive in the kelly pipe. Sealing disks in the form of neoprene blowout seals are used to hold the additive inside the sweep cartridge until the seals are partly ruptured by line water pressure. The sweep cartridge is retained inside the tool joint or the kelly pipe by retainers of various designs.

16 Claims, 2 Drawing Sheets

DRILLING FLUID ADDITIVE SWEEP CARTRIDGE AND METHOD

CROSS REFERENCES TO RELATED PATENT APPLICATIONS

Abandoned Utility patent application, Ser. No. 07/166,377, Filed 3/10/88 by Johnny C. Sherman and entitled "Capsulated Drilling Fluid Additive and Method"

BACKGROUND OF THE INVENTION

1. Field of Invention

This invention relates generally to drilling fluid additives and specifically relates to the packaging of the additives in a sweep cartridge which allows the insertion of the additive and the cartridge directly into the drilling operation by way of one of the drill pipes or the kelly pipe.

2. Description of Prior Art

During the course of drilling a well it is often advantageous to circulate concentrated amounts of drilling fluid additives, known as slugs, through the drill hole to obtain certain specific benefits such as flocculation of the drilled solids, stabilization of the bore hole and cleaning of the bore hole among others. The introduction of the slug of additive into the pipe is known as a drill pipe sweep.

When possible, a very effective means of introducing a small amount of concentrated additive is to simply pour the additive directly into the open drill string after the kelly pipe has been removed and while making a connection of another drill pipe to the drill string. When introduced in this manner, the additive is then pumped, by the normal pumping operation, down the drill string and back up the annulus between the drill string and the wall of the bore hole as drilling is resumed.

Utilization of this drill pipe sweep technique, of introducing additives into the system has very often been prevented by the U-tubing effect of the lighter fluids inside the drill string being forced to back-flow up through the drill string due to the somewhat higher density of the drilled solids-laden fluid in the annulus. As the kelly pipe is removed from the drill string prior to attaching the next drill pipe, water backflows out of the drill string until the pressures equalize. This results in a loss of time in the drilling operation should it be desired to introduce additive at this point into the drill string.

Generally it is not economically feasible to delay drilling operations by waiting for the back-flow of water to cease to allow space for additives to be poured into the drill string. The U-tubing effect can be prevented by using drill string floats or flapper check valves but operational limitations which these devices pose frequently prohibit their use since their application impedes pressure readings.

Even at best, a few minutes of valuable rig time is consumed in waiting for back-flow to cease and some degree of inconvenience is experienced in the process of pouring drilling fluid additives directly into the drill string during connection of the next drill pipe to the drill string. The cost of rig time has been estimated at Three Thousand Six Hundred Dollars ($3600) per day and drilling additives may be introduced into the system approximately forty-eight times during a 1500 ft. drilling day. If it takes approximately two minutes per connection and the back-flowing takes approximately ten minutes to equalize, then it can be readily seen how a better way of introducing additives to the system will be economically feasible if downtime can be minimized.

For a more detailed background on well drilling, the reader is referred to a booklet entitled, "A Primer of Oil Well Drilling," second edition issued by the University of Texas and the American Association of Oilwell Drilling Contractors, filed herewith as prior art. Other drilling methods are taught in the U.S. Pat. No. 4,473,124 issued on Sept. 25, 1984 to J. G. Savins.

The before mentioned drilling fluid additives are typified in the various U.S. Pat. No. 4,571,422 issued Feb. 18, 1986 to K. C. Symes et al; U.S. Pat. No. 4,063,603 issued Dec. 20, 1977 to J. J. Rayborn and U.S. Pat. No. 4,514,308 issued Apr. 30, 1985 to R. L. Clampett et al. Other additives are shown in the commercial literature by Nalco Chemical Company (Nalco brand ASP-700) and Allied Colloids Company (Alcomer brand 120L). All of the above are filed herewith as prior art.

It is known to introduce drilling fluid additives in the well bore by using a self-contained device as taught in the U.S. Pat. No. 4,191,254, issued on Mar. 4, 1980 to K. E. Baughman et al. This device is dropped down into the drill string and distributes additives after which the device dissolves or is forced through the orifices in the drill bit. The device is then ground up into tiny pieces which are carried on with the drilling mud. A similar concept is taught in the U.S. Pat. No. 4,611,664 issued on Sept. 16, 1986 to M. G. Osterhoudt III et al.

The lowering of a drilling fluid additive into the well bore by a device is taught in the U.S. Pat. No. 4,706,753, issued on Nov. 17, 1987 to K. Ohkochi et al. A weight is dropped onto the device to destroy the bottom plate of the device thereby releasing the fluid additives. The dropping of explosives into a bore hole is taught in the U.S. Pat. No. 3,986,430 issued on Oct. 19, 1976 to D. L. Coursen et al.

It is also known to use a device to restore lost circulation in a well as taught in the U.S. Pat. No. 3,362,476, issued Jan. 9, 1968 to H. K. van Poollen. Water soluble bags are filled with circulation-restoring materials which are lowered into the bottom of the well to react with fluid in the well-bore. In a similar manner, pellets have been used for water restoration as taught in the U.S. Pat. No. 2,836,555, issued on May 27, 1958 to A. L. Armentrout.

An arrangement for full hole drilling using a hole wall former which is lowered into the drill string in the vicinity of the drill bit is taught in the U.S. Pat. No. 4,378,050, issued to R. A. Tatevosian et al on Mar. 29, 1983.

Planar surfaces which are rupturable such as polystyrene are known in the art and are used in various applications such as covers for trays and are taught in the U.S. Pat. No. 3,916,076 issued Oct. 18, 1975 to F. E. Eastes.

The introduction of drilling fluid additives can also be accomplished in other places in the water pumping system of the drilling operations with various results in order to keep downtime at the drill rig to a minimum. However it is preferable to make a sweep or introduction of additive at every drill pipe connection and it would be best to do this at the connection of the drill pipe or at the kelly pipe. Drilling fluid additives such as flocculants and bore hole stabilizing polymers can be introduced into a clear water drilling operation at the pump suction or at the flow line as well as directly into the drill string.

Dripping liquid polymer into the suction tank probably improves hole stability and helps flocculate drilled solids during the one to two hours that a five gallon bucket lasts, but contributes little if any to hole cleaning.

Mixing a quart or so of liquid polymer in a chemical barrel and allowing it to drip into the drill water as it returns to the reserve pit flocculates drilled solids very well, but contributes nothing to hole cleaning or stability.

A drill pipe sweep on every pipe connection will provide a substantial degree of hole cleaning, hole stability and drilled solids flocculation. With this technique liquid polymer additions are made almost continuously or at frequent intervals and in direct proportion to the penetration rate.

SUMMARY OF THE INVENTION

In order to overcome the before mentioned problems of costly rig downtime and to better accomplish the introduction of drilling fluid additives into a drilling operation, there is taught herein the applicant's new and novel drilling fluid additive sweeping cartridge and there is taught a unique method of introducing additives using the novel cartridge.

Since the additives are universally added to a system in bulk form, then the addition of the novel sweep cartridge with additives in the cartridge directly into the drilling system at one of the drill pipes or at the kelly pipe is unique. The novel sweep cartridge with releasable sealing means using rupturable closed-cell neoprene seals contains the required additives and is positioned in either kelly pipe or the drill pipe and may also be introduced in other places in the system within the spirit and scope of the invention. The container has retaining means to retain it in one of the pipes until the drill pipe connection is completed to the drill string.

Upon starting the water flow, the water pressure in the kelly pipe will cause release of the sealing means as the neoprene seals partly rupture. This will then permit the introduction of the additive into the drill pipe. The sweep cartridge can be placed in the kelly pipe after it is disconnected from the drill string or it can be placed in the next drill pipe in the drilling rig floor which is positioned in a hole known as the mouse hole as shown in the preferred embodiment.

Since the fluid additive is in the novel sweep cartridge and not in a bulk liquid form, then interruption of the drilling operation is kept to a minimum. This is possible because the U-tubing effect or back-flowing of water does not have to be equalized or complete to introduce additives. A connection of the next drill pipe to the drill string can be made immediately since the addition of novel sweep cartridge in the drill pipe or kelly pipe can be made while drilling fluid is back-flowing up through the drill string during connections, a condition which prohibits pouring additive directly into the drill string as the before mentioned prior art method. After the kelly pipe is reconnected to the drill string, the water pressure breaks the neoprene blowout seals in the releasable sealing means in the preferred embodiment. Thereafter, the fluid additive is pushed out of the sweep cartridge by the line pressure and down into the top drill pipe and through the drill string.

The addition of drilling fluid additives in the novel sweep cartridge will provide a convenient, effective means of accomplishing a drill pipe sweep in any normal operation situation. This will be done with absolutely no delay of drilling operations. The various embodiments of the novel sweep cartridge along with the use of the cartridge in the method will be detailed hereinafter.

Accordingly it is an object and advantage of the invention to provide a new and novel drilling fluid additive sweep cartridge which allows an efficient means of accomplishing a drill pipe sweep in any normal operation.

Another object and advantage of the invention is to provide a new and novel method of introducing drilling additives in a novel sweep cartridge which requires no special skill or training to complete and which reduces costly downtime in the drilling operation.

Yet another object and advantage of the invention is to provide an improved package of drilling fluid additives which can be introduced at various places in the fluid system of a drilling operation and preferably into the kelly pipe or the drill pipe in the mouse hole.

These and other objects and advantages of the invention will become apparent from a study of the drawings and from a reading of the description of the preferred embodiment hereinafter.

DESCRIPTION OF THE PREFERRED EMBODIMENT

Figures 1, 2, 3, 4, 5, 6, 7, 8:
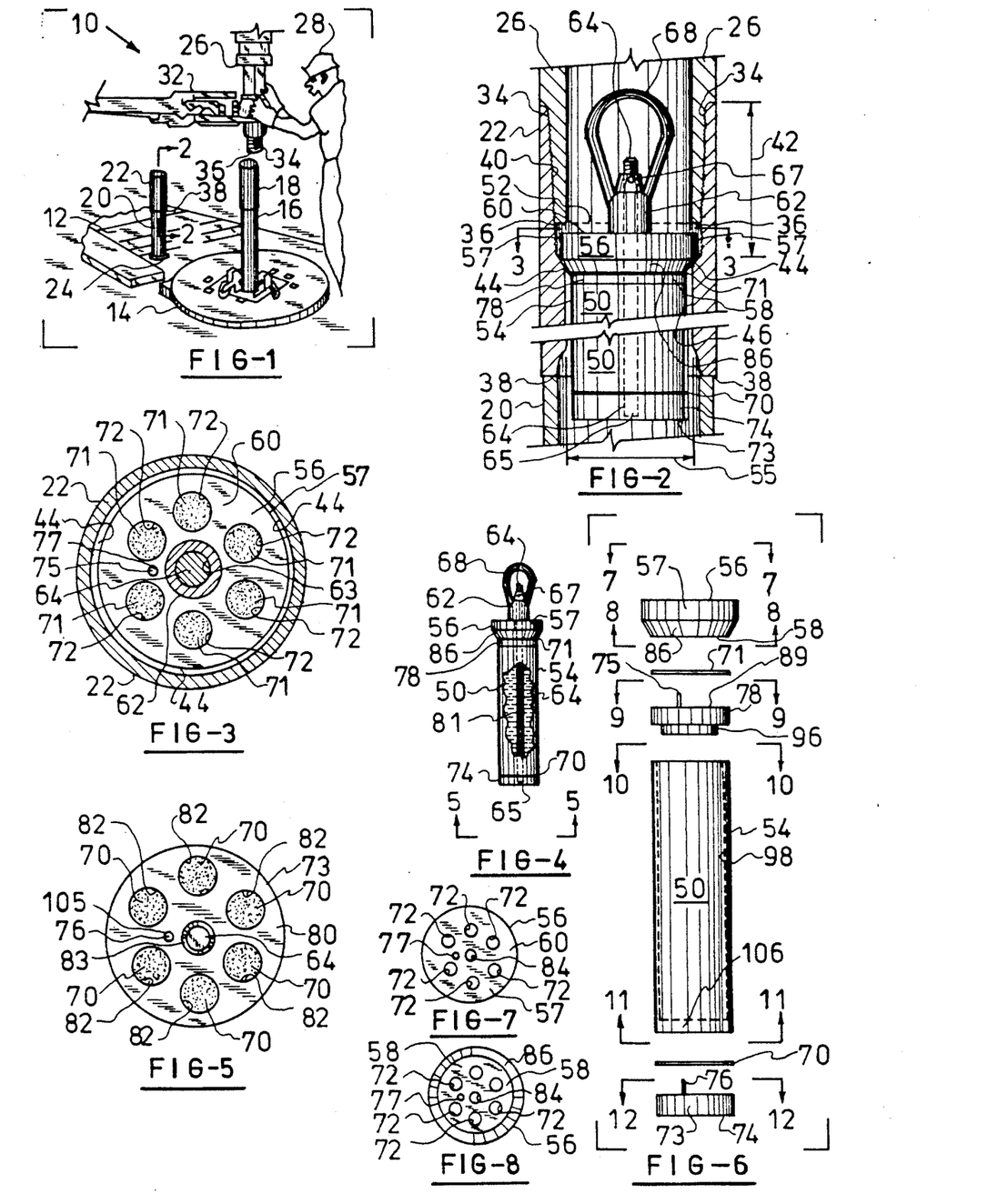
FIG. 1 is a perspective view of a drilling rig floor showing a drilling crewman holding the breakout tongs around a kelly pipe.
FIG. 2 is a cross-sectional view, taken along line 2—2 of FIG. 1, showing the next drill pipe in which the applicant's new and novel sweep cartridge would be positioned during the drilling operations and showing the sweep cartridge installed in the drill pipe with the kelly pipe attached.
FIG. 3 is a top plan view, taken along line 3—3 of FIG. 2 showing a portion of the upper sealing means or the second sealing means used in the sweep cartridge.
FIG. 4 is a side elevational view of the novel sweep cartridge used in the preferred embodiment showing, in a partial breakaway section, the internal drilling fluid additive.
FIG. 5 is a bottom plan view, taken along lines 5—5 of FIG. 4 showing a portion of the lower sealing means or the first sealing means used in the sweep cartridge.
FIG. 6 is an exploded side elevation view of the elongated outer container, the sealing means and the retainer means forming the sweep cartridge shown in FIG. 4. For purposes of clarity the lifting means is not shown in FIG. 6.
FIG. 7 is a top plan view, taken along lines 7—7 of FIG. 6 showing the upper retainer portion of the upper or second sealing means of the novel sweep cartridge.
FIG. 8 is a bottom plan view, taken along lines 8—8 of FIG. 6.

Referring now to the drawings in general and in particular to FIG. 1 of the drawings, there is shown a typical drilling operation generally by the numeral 10 which is conducted on a derrick floor 12 having a rotary table 14 positioned therein. A drill pipe 16 is exposed above the derrick floor 12 and is the top drill pipe of a string of pipes which are known as the drill string. A tool joint 18 is welded to the top of the drill pipe 16 and contains internal threads into which the threads 34 of the kelly pipe 26 are threaded as well as the next drill pipe 20 when added to the drill string.

A drilling crewman 28 is shown holding the breakout tongs 32 which have been used to loosen the kelly pipe 26 from the top drill pipe 16 of the drill string. The next drill pipe to be attached to the drill string would be numbered 20 and has a tool joint 22, similar to the tool joint 18, welded thereto at 38. The drill pipe 20 is positioned in a hole 24 in the derrick platform which is known as the mouse hole.

It is at the point shown in FIG. 1 in the drilling operation where it is desirable to add drilling fluid additives to the existing drill string. This is usually done by a crewman who pours a predetermined amount of fluid additives down into the drill pipe 16. This can only be done after drilling fluid back-flows out of the pipe in the before mentioned U-tubing effect and after the back-flow stops. Since the back-flow can last approximately ten minutes it can be seen that valuable lost downtime of the rig can occur at each addition of the thirty-one foot drill pipe to the drill string.

Referring now to FIG. 2 of the drawing there will be described in detail the applicant's solution to the before mentioned problem. Each drill pipe 16 or 20 has welded to the top thereof the tool joint numbered 18 or 22 in FIGS. 1 and 2. An internal thread 40 is formed in the tool joint for approximately four to five inches as shown by the numeral 42 in FIG. 2. A bottom annular inclined lip 44 is thereby formed in the tool joint between the internal diameter 46 of the tool joints 18 and 22 and between the internal thread 40 formed in the joints. This bottom inclined lip 44 may normally be used in the drilling operation to hold a corrosion ring not shown in the drawings.

In the preferred embodiment, the applicant's novel invention is designed to be positioned as shown in FIG. 2 on the bottom annular lip 44 and to be retained thereon until later removed. A novel sweep cartridge 50 containing drilling fluid additive can be positioned in the tool joint 22 of the drill pipe 20 positioned in the mouse hole 24 as shown in FIG. 2. The dashed line 52 would represent the extent of the bottom end of the kelly pipe 26 when its threads 34 were screwed into the threads 40 of the tool joint 22. When the kelly pipe 26 is thusly positioned the applicant's novel sweep cartridge 50 is not touched by the bottom 36 of the kelly pipe 26.

The novel sweep cartridge 50 would comprise an elongated outer container 54 having opposite upper and lower ends. The opposite ends would be sealed by novel sealing means so that the container 54 could hold a predetermined quantity of drilling fluid additive temporarily inside the container. The drilling fluid additives are filled in the sweep cartridge 50 at a remote site prior to being used in the drilling operation.

The sweep cartridge 50 with fluid additive contained inside thereof is positioned within the internal diameter 46 of the tool joint 22 of the next drill pipe 20 to be used in the drilling operation. The outer diameter or circumference of the sweep cartridge is sized to fit within the internal diameter 46 of the tool joint. This can be seen in FIG. 2 where the internal diameter 46 of the tool joint is represented by the dimension arrow 55.

The sweep cartridge 50 has fixedly attached to the upper open end of the cartridge a second sealing means 56. A first sealing means 74 is also fixedly attached thereto on the lower open end of the cartridge. The second sealing means 56 comprises in part an upper retainer 57 having a lower tapered surface 86 which is designed to rest in juxtaposition to the bottom annular inclined lip 44 on the tool joint 22. These items can be more clearly seen in FIGS. 4 and 6 of the drawings.

The bottom surface 58 of the upper retainer 57 engages a rupturable neoprene blowout seal 71 which is also engaged by a centering flange 78 which will be described in more detail hereinafter. The lower retainer 73 of the first sealing means 74 also engages a rupturable neoprene blowout seal 70 which is similar in construction to the rupturable seal 71. The construction of the blowout seals 70 and 71 will be detailed hereinafter when referring to FIGS. 17 and 18 of the drawings.

The top surface 60 of the upper retainer 57 has positioned thereon a threaded handle 62 which is tightly held in place on a threaded rod 64. A lifting loop 68 is formed on the threaded handle 62 and the entire handle is locked to the elongated threaded rod 64 by a cotter pin (not shown) which would be positioned in the hole 67 drilled through the threaded handle 62 and the elongated rod 64. When formed thusly, the threaded handle assembly forms the lifting means to raise and lower the sweep cartridge 50 out of and into the tool joint on one of the pipes.

As can be seen in FIG. 2, the elongated threaded rod 64 extends through the outer container 54 of the sweep cartridge 50 and down into the lower retainer 73 of the first sealing means 74. Threads on the lower end 65 of the elongated rod 64 are screwed into threads in the lower retainer 73 of the first sealing means 74 as will be described more fully hereinafter. When formed and assembled thusly the entire sweep cartridge 50, whether full of fluid additive or empty, is held together and is easily lifted into and out of the tool joint. The sweep cartridge is constructed of metal or plastic and is thusly reusable. It may also be constructed of other materials and may be formed of a breakable and/or disposable material such as a water soluble material or expanded polystyrene within the spirit and scope of the invention.

The rupturable seal 71 on the upper portion of the sweep cartridge 50 and the rupturable seal 70 on the lower portion of the cartridge form part of the sealing means used to seal or temporarily hold the fluid additive within the cartridge as desired until the fluid additive can be released by breaking portions of the rupturable seal as will be described more fully hereinafter.

Referring now to FIG. 3 there is shown more detail on the sweep cartridge 50. FIG. 3 is a top plan view taken along line 3—3 of FIG. 2 and shows how the sweep cartridge 50 is positioned in the tool joint 22 and is held therein by the bottom lip 44 of the tool joint. The top surface 60 of the upper retainer portion 57 of the second sealing means 56 contains a plurality of holes 72 which expose portions of the rupturable seal 71 shown spackled in FIG. 3. These are the portions of the rupturable seal that will rupture to permit the drilling fluid additive to be released from the sweep cartridge. A centering hole 77 is drilled through the upper retainer 57 and is used to contain a centering pin 75 fixedly attached to the centering flange 78 as will be described more fully hereinafter. FIG. 3 also shows how the threaded elongated rod 64 is threaded in a drilled and tapped hole 63 in the threaded handle 62.

Referring now to FIG. 4, there is shown a reduced side elevational view of the novel sweep cartridge used in the preferred embodiment showing, in a partial breakaway section, the internal drilling fluid additive 81. FIG. 4 also clearly shows how the elongated rod 64 is internally positioned within the sweep cartridge 50 and is used to hold the upper sealing means 54 and the lower sealing means 74 tightly in place. The two sealing means permit the drilling fluid additive to be retained within the sweep cartridge until the additive is released as the neoprene blowout seals partly rupture.

Referring now to FIG. 5, there is shown an enlarged bottom plan, taken along lines 5—5 of FIG. 4. The lower retainer 73 of the lower sealing means 74 contains a plurality of holes 82 formed around the bottom surface 80 of the lower retainer 73. The holes 82 extend through the retainer 73 and terminate at the lower neoprene rupturable seal 70, shown spackled in FIG. 5. The seal in the spackled area also partly ruptures to permit the internally contained drilling fluid additive to be released from inside the sweep cartridge. Centrally positioned between the holes 82 is a drilled and tapped hole 83 into which is threaded the lower end 65 of the threaded elongated rod 64.

It can thereby be seen how the entire sweep cartridge is held together with the elongated rod being screwed into the drilled and tapped hole 83. On the upper end of the sweep cartridge 50 the threaded handle 62 tightly positioned the opposite facing sealing means 56 and 74 against the outer container 50. Before describing in more detail the construction of the rupturable neoprene blowout seals 70 and 71 along with the drilling fluid additive there will be described in more detail, the internal structural components of the sweep cartridge 50.

FIG. 6 is an exploded side elevation view of the elongated outer cylinder 50, the sealing means 56 and 74 and the retainer means for retaining the sweep cartridge within the pipe 20. Also shown in FIG. 6 are the internal components used in conjunction with the above described items and forming a part thereof. For purposes of clarity, the lifting means for lifting the sweep cartridge has not been shown and the elongated rod 64 and the fluid additive 81 have been deleted also.

FIG. 6 clearly shows the respective parts of the sweep cartridge 50 and how they are held together by the elongated rod 64. However, it should also become apparent that other designs of the sweep cartridge are possible within the spirit and scope of the invention. In the exploded view of FIG. 6 there can be seen how the rupturable neoprene blowout seals 70 and 71 are positioned between their respective portions of the sealing means. For example, the upper rupturable seal 71 is held between the upper retainer 57 and the centering flange 78.

In a similar manner, the lower rupturable seal 70 is held between the lower retainer 73 and the bottom wall 106 of the outer container portion of the sweep cartridge 50. In a like manner the pins 75 and 76 insure the proper alignment of the various holes contained above and below the rupturable seals 70 and 71 in the respective parts. This insures that the various holes will always be aligned to insure that the fluid additive can be released from the sweep cartridge at a predetermined time.

Referring now to FIGS. 7 and 8, there will be seen the positioning of the holes 72 in the upper retainer 57 of the upper sealing means 56. A centrally positioned hole 84 is drilled or formed therein to permit the elongated threaded rod 64 to pass through. In addition, a small centering hole 77 is drilled or formed through the upper retainer 57 of the upper sealing means 56 and is designed to receive the pin 75 contained in the centering flange 78. A tapered surface 86 is formed on the upper retainer 57 of the upper sealing means 56 and this surface 86 seats on the annular bottom lip 44 of the tool joint 22 as shown in FIG. 2. The bottom surface 58 of the upper retainer 57 seats on the upper rupturable seal 71.

Figures 9, 10, 11, 12, 13, 14, 15:
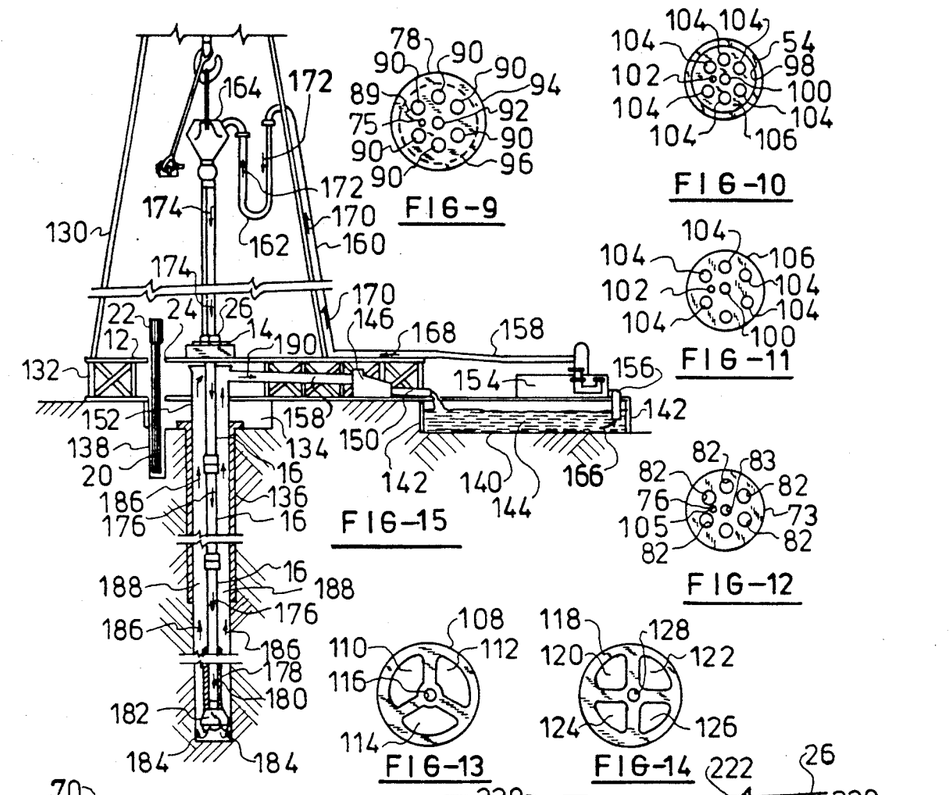
FIG. 9 is a top plan view, taken along lines 9—9 of FIG. 6 showing the centering flange portion of the upper or second sealing means of the novel sweep cartridge.
FIG. 10 is a top plan view, taken along lines 10—10 of FIG. 6 looking into the elongated outer container portion of the sweep cartridge.
FIG. 11 is a bottom plan view, taken along lines 11—11 of FIG. 6.
FIG. 12 is a top plan view, taken along lines 12—12 of FIG. 6, showing the lower retainer portion of the lower or first sealing means of the novel sweep cartridge.
FIGS. 13 and 14 are plan views, similar to the views of FIG. 7-12, showing modified forms of the holes positioned in the various parts which are in juxtaposition to the blowout seals forming portions of the first and second sealing means.
FIG. 15 is a cross-sectional elevational view of the complete drilling rig showing in detail the liquid flow system or mud flow in the drilling operation.

FIG. 9 is a top plan view, taken along lines 9—9 of FIG. 6. The upper surface 89 of the centering flange 78 seats also on the upper rupturable seal and contains a centrally positioned hole 92 to receive the elongated rod 64. A plurality of holes 90 are formed in the same location as the holes 72 in the upper retainer 57 of the upper sealing means 56. The pin 75 is press fit into a mating hole, not shown, in the upper surface 89 of the centering flange 78 and is located in the position shown in FIG. 9 to line up with the hole 77 in the upper retainer 57 of the upper sealing means 56. When aligned as described the pin 75 in the hole 77 assure that the holes 72 and the holes 90 will be in alignment on each side of the rupturable seal 71.

Referring now to FIG. 10, there is shown a top plan view, taken along line 10—10 of FIG. 6 looking into the elongated outer container portion of the sweep cartridge 50. The inner circumference 98 of the sweep cartridge 50 is designed to receive the outer circumference 96 on the lower portion of the centering flange 78, which is shown dashed in FIG. 9. The outer circumference or surface 54 of the sweep cartridge 50 is formed the same diameter as the outer circumference 94 of the centering flange 78.

As before mentioned, the sweep cartridge 50 may be formed with a bottom wall 106 which contains a central hole 100 designed to receive the threaded rod 64. A plurality of outer holes 104 are drilled or formed in the bottom wall 106 and a smaller hole 102 is also formed or drilled therein to receive the centering or alignment pin 76.

FIG. 11 shows a bottom plan view, taken along lines 11—11 of FIG. 6 and shows the circularly positioned holes 104 and the alignment hole 102 as well as the center hole 100 drilled or formed completely through the bottom wall 106. FIG. 12, taken along lines 12—12 of FIG. 6 shows the lower retainer 73 of the lower sealing means 74 containing the centering pin 76 in the hole 105 as before described. In a like manner the lower rupturable seal 70 is sandwiched between the bottom wall 106 and the lower retainer 73 of the lower sealing means 74 with the pin 76 assuring a proper alignment of the holes 82 and 104 when the elongated rod 64 is positioned in the central holes 83 and 100. The proper alignment of the internal holes in the sweep cartridge on each side of the blowout seals assures that the drilling fluid additive will be released from the cartridge 50 whenever the seals are ruptured by line pressure.

FIGS. 13 and 14 are plan views, similar to the views of FIGS. 7-12, and show modified sealing means 108 and 118 with different shape holes. The FIG. 13 modification uses three holes 110, 112 and 114 while the FIG. 14 modification uses four holes 120, 122, 124 and 126 as shown. The central hole 116 as well as the central hole 128 would also receive the elongated rod 64 with either modifications. In addition, a centering or alignment hole and pin would also be used with these modifications and other alignment means could be used within the spirit and scope of the invention. For purposes of brevity, the alignment pins and holes have not been shown in FIGS. 13 and 14.

Referring now to FIG. 15 of the drawings there will be discussed in more detail the operation of the circulation of drilling fluids in the fluid or mud flow system of a drilling operation. This will be helpful in understanding the uniqueness of the applicant's invention and the method of using it. A derrick 130 sits on a substructure 132 which is positioned over an excavated hole 134. The surface casing 136 surrounds the plurality of drill pipe 16 forming the drill string in the bore hole.

A second hole 138 is drilled so that the drill pipe 20 can be positioned in the mouse hole 24 on the derrick floor 12. The drill pipe 20 is the same type of pipe as the drill pipe 16 and is the next drill pipe to be added to the drill string when the drilling operation is stopped and the kelly pipe 26 is removed.

A reserve pit 140 is excavated and pit walls 142 are used to hold the drilling fluid 144 which consists basically of water, chemicals and other additives as well as dirt and rock particles which are removed from the bore hole by the circulating fluid. The reserve pit serves not only to contain the drilling fluid, but also provides a nearly static environment which allows time for drilled solids to settle-out of the fluid before it returns to the pump suction.

Drilling fluid is pumped throughout the system by a pump or series of pumps 154 through the suction inlet 156 positioned in the reserve pit 140. The pump pressure line 158 transports the drilling fluid in the direction shown by the arrow 168. The fluid then flows upwardly in the standpipe 160 in the direction shown by the arrow 170 to the kelly hose 162 in the direction shown by the arrows 172. The fluid then flows through the hose coupling 164 known as the swivel which forms the connection between the pumps 156 and the drill string and permits rotation of the drill string.

The fluid then flows downwardly in the direction shown by the arrow 174 through the kelly pipe 26 and into the drill string comprising the plurality of drill pipe 16 in the direction of the arrow 176. The drill collars 178 are fixed to the drill bit 182 and the fluid continues to flow through the drill collars in the direction shown by the arrow 180 and through the drill bit 182 outwardly in the direction 184 and upwardly in the direction 186 through the annular space 188 between the drill string and the bore hole. The fluid exits the bore hole through the top extension 152 of the surface casing 136 and out the fluid return line 158 in the direction of the arrow 190 passing through shale shaker 146 and the shale slide 150 and then to the reserve pit 140 where it settles and ultimately returns through the suction line 156 in the direction of the arrow 166.

When the applicant's novel sweep cartridge 50 holding the drilling fluid additive 81 is positioned in each drill pipe tool joint 22 that is positioned in the mouse hole 24, the drilling fluid additive is released from the sweep cartridge 50 by the pressure of the pumps 156 whenever the fluid starts to flow upon starting up of the drilling operation. The rupturable neoprene blowout seals 70 and 71 then partially break in the vicinity of their aligned holes and release the drilling fluid additive 81 into the drilling water as the additive and the water pass out of the sweep cartridge through the internal holes in the cartridge. In other words, the pumped drilling water passes through the sweep cartridge after breaking the seals 70 and 71 to flush the drilling fluid additive 81 out of the sweep cartridge and into the drill string.

In regard to the type of additive to package in the applicant's sweep cartridge 50, it is felt that the best additive would have certain characteristics usable in most drilling operations. Initial production of capsulated drilling fluid additives will contain a high activity liquid, acrylamide-based, high-molecular-weight, anionic copolymer. This product will provide (1) hole cleaning as the small concentrated, viscous sweep is pumped through the drill bit 182 and back to surface, (2) stabilization of the bore hole as polymer adheres to the wall of the bore hole, thus impeding infiltration of drillwater from the bore hole into the surrounding formation, (3) flocculation of drilled solids to enhance settling-out of even fine silty particles as the drill-water is returned to the reserve pit 140.

Other drilling fluid additives considered for use in capsule form include non-ionic, anionic and cationic flocculants. These additives are of course primarily used for flocculation of drilled solids in various drilling fluids but they secondarily provide varying degrees of hole stability as well as hole cleaning. Another possibility would be to blend one of the flocculants with the acrylamide-based copolymer to enhance its ability to settle-out fine silty drilled solids.

Drilling fluid additives manufactured by Nalco Chemical Company of Sugarland, Tex. such as ASP-700 and others could be used in the applicant's sweep cartridge 50. In addition additives manufactured by Allied Colloids Company of Suffolk, Va. such as Alcomer 120L and others could also be packaged in applicant's breakable container.

Figures 16, 17, 18, 19, 20:
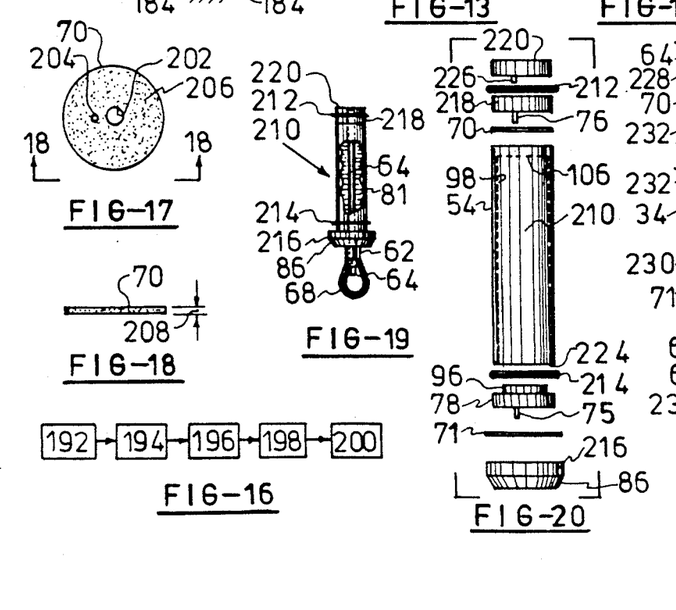
FIG. 16 is a diagrammatic view showing the steps in the method of the applicant's invention.
FIG. 17 is a top plan view of the neoprene blowout seals used in the sweep cartridge of the invention.
FIG. 18 is a side elevational view, taken along lines 18—18 of FIG. 17.
FIG. 19 is a view, similar to the view of FIG. 4, showing a modified form of the sweep cartridge that can be used for insertion in the kelly pipe.
FIG. 20 is an exploded view, similar to the view of FIG. 6, showing in more detail the modified form of the sweep cartridge of FIG. 19.

Referring now to FIG. 16 there will briefly be described the applicant's novel method of using his novel sweep cartridge 50 with drilling fluid additives contained therein. A plurality of the before described sweep cartridges 50 would be provided, in Step 1 shown as the numeral 192, and would be filled with a predetermined quantity of additives 81 and would be temporarily sealed inside the cartridge. In Step 2 as shown as the numeral 194, a single filled sweep cartridge 50 would be positioned at a predetermined time in the drilling operation in one of the pipes of the drilling system with the sweep cartridge's retaining means holding the cartridge 50 with additive 81 in the pipe for a predetermined time.

Thereafter, the rupturable seals 70 and 71, in Step 3 shown as the numeral 196, would be broken by the pressure of the pumped drilling fluids to mix the drilling fluid additives with the drilling fluid. In Step 4 shown by the numeral 198, the empty sweep cartridge 50 would be removed at a predetermined time. Steps 2-4 would then be repeated, in Step 5 shown as the numeral 200, at predetermined times as required during the drilling operation.

From the foregoing there has been provided a novel sweep cartridge 50 filled with drilling fluid additives 81 that can be positioned in one of the pipes in the drilling operation to inject the additives in a new way into the drill pipe. The novel sweep cartridge 50 has novel temporary sealing means using the neoprene rupturable blowout seals 70 and 71 that are partly broken in the vicinity of the aligned holes by pressures of the mud pumps 154 sufficiently to allow the additive 81 to be released from the sweep cartridge 50 and to pass into the drill string 16. FIG. 17 is a top plan view of the neoprene seals 70 and 71 used in the novel sweep cartridge 50. A central hole 202 along with an alignment hole 204 would be cut or punched in the circular face 206 of the seal. When cut thusly, the central elongated threaded rod 64 as well as the alignment pins 75 and 76 could be positioned through the seals without adversely affecting the integrity of the seal.

FIG. 18 is a side elevation view, taken along lines 18—18 of FIG. 17. In the preferred embodiment shown, the rupturable seals 70 and 71 would be formed of a material known as a closed-cell neoprene which would be approximately one sixteenth of an inch thick as shown by the numeral 208. A typical material would be the tradename Rubatex R SCE 42 manufactured to ASTM specifications D-1056-67.

A material such as this would be capable of retaining the drilling fluid additive 81 inside the sweep cartridge 50 until line pressure would be applied to the seals 70 and 71. Thereafter the material will partly rupture or blowout in the open area at the aligned holes in the cartridge. Other materials could also be used within the spirit and scope of the invention. The blow out seals 70 and/or 71 could also be replaced with check valves or a similar device to permit the drilling fluid additive to be released from the sweep cartridge 50 at a predetermined time as the line pressure is applied to the system from the pump 154. An initial starting up pressure of 800-1500 psig. of the pump 154 will be sufficient to cause the blowout seals 70 and 71 to partly rupture at the internally aligned holes in the sweep cartridge.

Referring now to FIG. 19 there is shown a side elevational view, similar to the view of FIG. 4, showing a modified sweep cartridge 210 which would be used to position in the kelly pipe 26 as before mentioned. The modified sweep cartridge 210 is constructed basically the same as the preferred embodiment cartridge 50 with the exception that it is placed up into the kelly pipe 26 instead of down into the tool joint 22 of the drill pipe 20 in the mouse hole 24.

As a result of this upside down position, the sweep cartridge 210 has been designed as shown in FIG. 19. Since the cartridge is to be held or retained within the inside surface of the kelly pipe 26, then further retainer means must be used to hold the cartridge in place. An upper retainer compression ring 212 of rubber or some other soft material is positioned as shown in FIG. 19 along with a similar lower compression ring 214. These compression rings 212 and 214 are then used to hold, by a friction fit, the modified sweep cartridge 210 upside down in the kelly pipe. Since the cartridge is now used upside down, the modified sealing means 216 has been designed and positioned as shown on the bottom of the sweep cartridge with a lifting loop 68 as before described.

The sealing means 218 has also been modified, as will be described later, and a retainer 220 has also been added as shown. The elongated threaded rod 64 is still centrally located as shown and now threads into the retainer 220 positioned on the top of the cartridge 210 as shown. When formed thusly, the entire cartridge 210 is tightly held together in a manner similar to the preferred embodiment shown in FIG. 4 but in a reverse or upside down position as shown in FIG. 19.

Referring now to FIG. 20, there is shown an exploded view, similar to the view of FIG. 6 showing the internal components of the modified sweep cartridge 210. As can be seen in FIG. 20, the new retainer compression ring 212 is sandwiched between the top retainer 220 and the modified sealing means 218. In a similar manner the new compression ring 214 is sandwiched between the sweep cartridge open end 224 and the centering flange 78.

In the modified sweep cartridge 210, the internal construction would be similar to the preferred embodiment with the plurality of outer positioned holes, such as 72, 90, 104 and 82 being used in combination with the inner blowout seals 70 and 71. In addition, the various alignment or centering pins 75 and 76 would also be used in combination with the holes 77, 102 and 105. In addition, the retainer 220 would also have a plurality of holes positioned in alignment with the holes 82 in the retainer of the sealing means 218 similar to the retainer 73 of the sealing means 74.

An alignment pin 226 would also be used to properly align the holes in the retainer 220 to assure that the blowout seals 70 and 71 would be able to function with all holes in aligment. The modified sealing means 218 would also contain a central drilled hole in place of the drilled and tapped hole 83 shown in FIG. 12. In a like manner the retainer 220 would contain a central drilled and tapped hole similar to the hole 83 in FIG. 12. When constructed thusly, the elongated threaded rod 64 would pass through the modified sealing means 218 and would screw into the central hole in the retainer 220.

Since the retainer compression rings 212 and 214 are formed of soft rubber, the tightening of the threaded handle 62 on the threaded elongated rod 64 will compress the soft rubber compression rings 212 and 214 so that they will expand outward slightly enough to cause a friction fit to be obtained of the modified sweep cartridge 210 on the inside circumference 222 of the kelly pipe 26.

Figure 21:
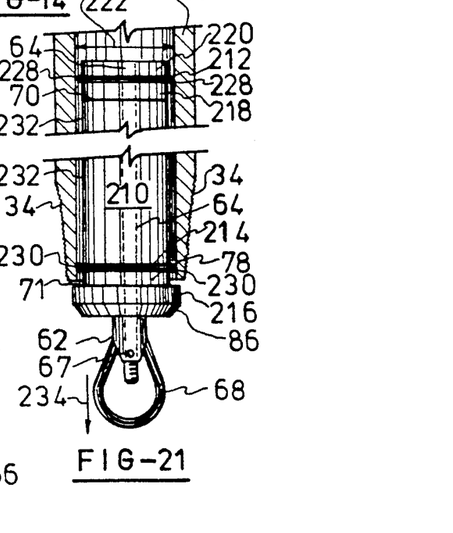
FIG. 21 is a view, similar to the view of FIG. 2, showing the modified sweep cartridge positioned in the kelly pipe.

FIG. 21 is a view similar to the view of FIG. 2 showing the modified sweep cartridge positioned upside down inside the kelly pipe 26. The upper retainer soft rubber compression ring 212 is shown expanded to cause a friction fit at 228 while the lower retainer soft rubber compression ring 214 is shown expanded to cause a friction fit at 230. The outer circumference 232 of the modified sweep cartridge would be designed to be somewhat smaller than the inside circumference 222 of the kelly pipe. The expanded compressed soft rubber retainer compression rings 212 and 214 then would provide a sufficient friction fit to permit the worker to be able to press the modified sweep cartridge 210 up and into the kelly pipe 26 where it will be held as shown in FIG. 21 and to later remove the empty cartridge 210 as desired to replace it with a new sweep cartridge 210 filled with additives 81.

The design of the tolerances and clearances would also be such that the modified sweep cartridge 210 would be retained inside the kelly pipe 26 and could also be easily removed by the worker, when desired, by simply pulling downwardly in the direction shown by the arrow 234. The retained modified sweep cartridge 210 would also rest on the annular lip 44 of the tool joint since the modified sealing means 216 also contains an annular inclined surface 86. This would occur whenever the kelly pipe threads 34 were screwed into the internal threads 40 on the tool joint of the drill pipe.

From the foregoing it can be seen that there is provided by the applicant's invention a novel drilling fluid additive sweep cartridge and method that permits the drilling fluid additive to be introduced into the drilling system at the drilling floor. The novel sweep cartridge designs permit the introduction either into the kelly pipe or into the tool joint of the next pipe added to the drill string which is positioned in the mouse hole.

While the preferred embodiment of the invention and the modified form shown have been constructed of metal parts which allows the sweep cartridge to be reusable and refillable, the cartridges may also be constructed of plastic or some other reusable material within the spirit and scope of the invention. They may also be formed of a disposable material such as expanded polystyrene and also may be formed of a water soluble material that will dissolve and disintegrate when introduced into the piping system.

While the constructions shown in the drawing views represent the present state of design, other changes in the design features and various parts may be utilized, all within the spirit and scope of the invention. For example, a check valve construction may be used to replace one or both of the blowout seals 70 and 71. Accordingly, the embodiments shown and described have been given by way of illustration only and the applicant is not to be limited to these descriptive and illustrative embodiments.

Having described my invention, I claim:

1. A drilling fluid additive sweep cartridge used with drilling fluid, the cartridge being used during the operation of drilling using a kelly pipe at the drilling platform to turn a drill string made up of a plurality of drill pipes and where a drill bit is used to drill a bore hole in the drilling operation, comprising:
   (a) an elongated outer container having opposite upper and lower open ends thereon and designed to fit at least partly within one of the pipes at the drilling platform;
      (1) first rupturable sealing means, fixedly attached to the lower open end to temporarily seal the open lower end so that the outer container may be filled with a drilling fluid additive which may be temporarily retained inside the outer container, the first sealing means then at least partly rupturing at a predetermined time from drilling fluid pressure;
      (2) second rupturable sealing means, fixedly attached to the upper open end to temporarily seal the upper open end so that the drilling fluid additive in the outer container will not be able to escape until a pre-determined time as desired, the second sealing means then at least partly rupturing at a predetermined time from drilling fluid pressure; and
   (b) retainer means, fixedly attached to the sweep cartridge to retain the sweep cartridge in a predetermined position inside one of the pipes at the drilling platform as the cartridge is positioned in one of the pipes.

2. The sweep cartridge as defined in claim 1 wherein the first sealing means comprises in part:
   (a) a bottom retainer having a plurality of holes formed therein; and
   (b) a first blowout seal, positioned on top of the bottom retainer, the blowout seal being formed of a rupturable material that will hold the drilling fluid additive inside the outer container and will partially rupture after pressure is applied to the seal to thereby allow the drilling fluid additive to flow out of the plurality of holes formed in the bottom retainer.

3. The sweep cartridge as defined in claim 1 wherein the second sealing means comprises in part:
   (a) an upper retainer having a plurality of holes formed therein;
   (b) a centering flange having a plurality of holes formed therein and in juxtaposition to the holes formed in the upper retainer; and
   (c) a second blowout seal, positioned between the upper retainer and the centering flange to temporarily seal the upper end of the outer container, the second blowout seal being formed of a rupturable material that will partially rupture after pressure is applied to the seal.

4. The sweep cartridge as defined in claim 1 wherein the retainer means is formed in the vicinity of the second sealing means.

5. The sweep cartridge as defined in claim 1 further comprising lifting means, fixedly attached to the sweep cartridge to raise and lower the cartridge out of and into one of the pipes as desired.

6. A method of introducing drilling fluid additives into a drilling operation at a drilling site in which a kelly pipe is attached to one drill pipe at the drilling platform of a drill string and is used to turn the drill string made up of a plurality of drill pipe while drilling fluids are being pumped downwardly through the drill string and where a drill bit is used to drill a bore hole in the drilling operation, comprising the steps of:
   a. providing a plurality of sweep cartridge containing a pre-determined quantity of drilling fluid additives, the sweep cartridge being constructed of an outer container with first temporary sealing means and second temporary sealing means to temporarily hold the fluid additive within the outer container and to release the fluid additive at a pre-determined time as desired, the container also containing retaining means to retain at least a portion of the container within one of the pipes;
   b. positioning and retaining one of the sweep cartridges filled with drilling fluid additive at a pre-determined time in the drilling operation, in one of the pipes at the drilling platform with the retaining means holding the container within the pipe for a predetermined time;

c. breaking at least a portion of the first and second temporary sealing means by the pressure of the pumped drilling fluids so that the drilling fluid additive contained in the outer container is emptied from the sweep cartridge and is mixed with the drilling fluids;

d. removing the emptied sweep cartridge at the drilling platform at a predetermined time in the drilling process; and e. repeating steps b.-d. at predetermined times as required during the drilling operation at the drilling platform as the plurality of drill pipe are added to the drill string.

7. The method as defined in claim 6 wherein the sweep cartridges with drilling fluid additives are positioned in the kelly pipe.

8. The method as defined in claim 6 wherein the sweep cartridges with drilling fluid additives are positioned in the drill pipe.

9. In the packaging of drilling fluid additives which are used with drilling fluids during the operation of drilling using a kelly and the adjacent drill pipe to turn a drill string made up of a plurality of drill pipe and where a drill bit is used to drill a bore hole in the drilling operation, the improvement comprising packaging the drilling fluid additives in a retainable sweep cartridge constructed of an outer container with upper and lower rupturable sealing means for temporarily sealing the drilling fluid additive in the outer container with at least a portion of the upper and lower rupturable sealing means being rupturable by the drilling fluid so that at a predetermined time the drilling fluid additive may be released into the drill string, the retainable sweep cartridge being retained in juxtaposition to the junction of the kelly pipe and the adjacent drill pipe in the drilling operation in order to allow later removal of the cartridge when adding the next adjacent drill pipe.

10. The improvement as defined in claim 9 wherein the retainable sweep cartridge is constructed with an upper sealing means and a lower sealing means.

11. The improvement as defined in claim 9 wherein the sweep cartridge is reusable and contains lifting means for use in lifting the cartridge and inserting the cartridge inside of a drill pipe and for later removing the cartridge from the drill pipe.

12. A sweep cartridge for use at a drilling platform and for holding and releasing drilling fluid additives used in a drilling operation with drill pipes, drilling fluid and a kelly pipe along with an adjacent drill pipe, comprising: a generally elongated outer container for temporarily holding and then releasing the additives, the container being formed with upper and lower releasable sealing means that are strong enough to contain the drilling fluid additive inside the elongated outer container, the upper and lower releasable sealing means also being formed such that it will release the additive into the drill pipe when pressure from drilling fluid is applied to the sweep cartridge in the drilling operation; the sweep cartridge further containing retaining means to retain the sweep cartridge in juxtaposition to the junction of the kelly pipe and the adjacent drill pipe in the drilling operation in order to allow later removal of the cartridge when adding the next adjacent drill pipe.

13. The sweep cartridge as defined in claim 12 further comprising the sweep cartridge containing lifting means for lifting the additive filled cartridge into the pipe and for removing the empty cartridge from the pipe as desired.

14. The sweep cartridge as defined in claim 12 wherein the releasable sealing means comprises in part at least one blowout seal.

15. The sweep cartridge as defined in claim 12 wherein the retaining means is formed to retain the sweep cartridge in one of the drill pipes.

16. The sweep cartridge as defined in claim 12 wherein the retaining means is formed to retain the sweep cartridge in the kelly pipe.

* * * * *